Oct. 14, 1958   J. W. JACOBS   2,855,761
ENGINE DRIVEN REFRIGERATING APPARATUS
Filed April 28, 1955   4 Sheets-Sheet 1

INVENTOR.
James W. Jacobs
BY
*R R Candor*
His Attorney

Oct. 14, 1958 J. W. JACOBS 2,855,761
ENGINE DRIVEN REFRIGERATING APPARATUS
Filed April 28, 1955 4 Sheets-Sheet 2

INVENTOR.
James W. Jacobs
BY
R R Candor
His Attorney

INVENTOR.
James W. Jacobs
BY
His Attorney

Oct. 14, 1958 J. W. JACOBS 2,855,761
ENGINE DRIVEN REFRIGERATING APPARATUS
Filed April 28, 1955 4 Sheets-Sheet 4

INVENTOR.
James W. Jacobs
BY R R Caudor
His Attorney

United States Patent Office 2,855,761
Patented Oct. 14, 1958

2,855,761

ENGINE DRIVEN REFRIGERATING APPARATUS

James W. Jacobs, Dayton, Ohio, assignor to General Motors Corporation, Detroit, Mich., a corporation of Delaware Application April 28, 1955, Serial No. 504,649

4 Claims. (Cl. 62—209)

This invention relates to refrigerating apparatus and more particularly to a variable ratio drive suitable for use between an automobile engine and a refrigerant compressor driven thereby, the compressor being a part of a refrigerating system for conditioning the air of a compartment in the car.

An object of this invention is to provide a variable ratio drive between the engine of an automobile and a compressor, which drive is of the fluid type and is variably responsive to a speed condition on the car.

Another object of this invention is to provide a fluid drive with a valve for varying the effectiveness of the fluid drive, which valve is on the axis of revolution of the fluid drive.

Another object of this invention is to provide a pump type of transmission with a fluid conduit from the outlet or discharge portion of the pump to the inlet or intake portion of the pump, and with a conduit connecting such portions and having a valve to vary the effectiveness of the transmission.

Further objects and advantages of the present invention will be apparent from the following description, reference being had to the accompanying drawings wherein a preferred form of the invention is clearly shown.

Figure 1:
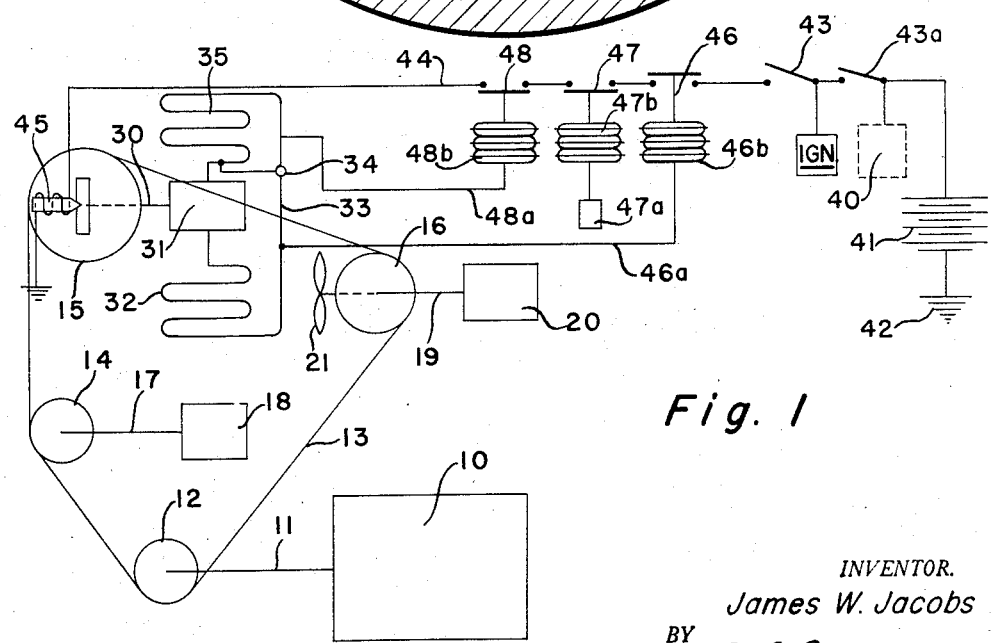
Figure 1 is a diagrammatic representation of the engine, refrigerating system and transmission.

Referring first to Figure 1, an automobile engine 10 has a shaft 11 to which is secured a pulley 12. The pulley 12 drives the belt 13, which drives the pulleys 14, 15 and 16. Pulley 14 is secured to shaft 17 of the generator 18. Pulley 15 is a part of the fluid transmission to be described. Pulley 16 is secured to the shaft 19 of the water pump 20 and radiator fan 21.

The pulley 15 is part of a rotary driving member which drives the driven member or shaft 30 of the compressor 31. Compressor 31 compresses refrigerant and discharges it into the condenser 32, connected by line 33 and thermostatic expansion valve 34, with the evaporator 35 which is connected to the suction side of the compressor 31.

The automobile is provided with the usual electrical system, part of which is indicated by the dotted rectangle 40. It also includes the battery 41 grounded at 42 and connected to the manual switch 43 for energizing and deenergizing the electric line 44 connected to the solenoid 45 which controls the transmission to be described. Ignition switch 43a controls both the ignition and air conditioning system. In addition, the line 44 is provided with switches 46, 47 and 48. Switch 46 opens when the condenser pressures are above a predetermined limit through the action of tube 46a and bellows 46b. Switch 47 opens when the compartment temperature in the car is below a predetermined low limit and closes when the compartment temperature reaches a predetermined high limit through the action of bulb 47a and bellows 47b. The bulb 47a can be located in the compartment to be conditioned. Switch 48 opens when the evaporator pressure is reduced below a predetermined pressure corresponding to a freezing temperature through the action of tube 48a and bellows 48b.

Figure 3:
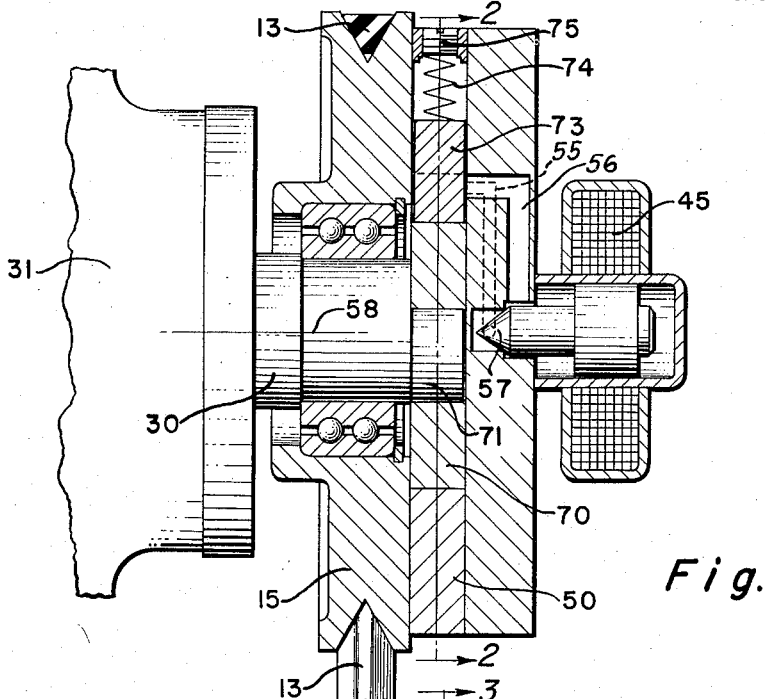
Figure 3 is a longitudinal cross-section of the transmission taken along the line 3—3 of Figure 2.
Figure 2:
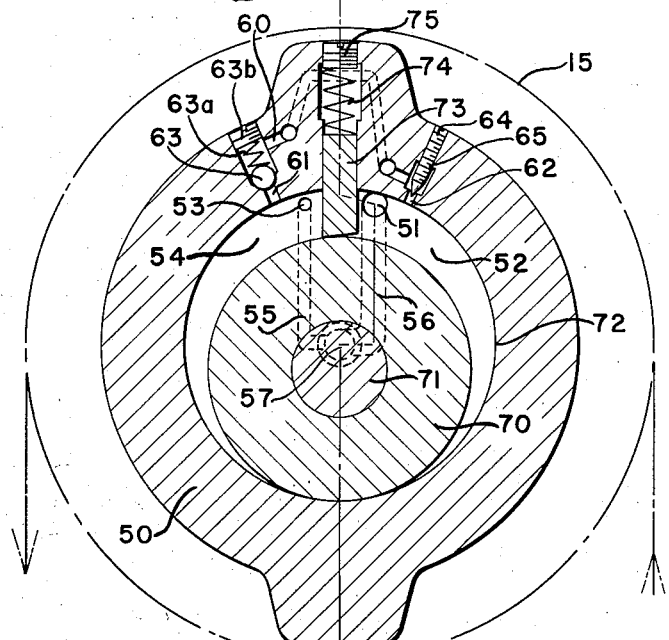
Figure 2 is a transverse cross-section of the transmission taken along the line 2—2 of Figure 3.

Referring now more particularly to Figures 2 and 3, the driving member of the transmission includes the pulley 15 and a pump cylinder 50, which is in continuous or fixed drive connection with the driving pulley 15. The cylinder 50 has a fluid inlet 51 adjacent the intake portion 52 of the pump. The cylinder also has a fluid outlet 53 adjacent the fluid discharge portion 54 of the pump. A fluid passage 55 and 56 connects the outlet 53 to the inlet 51 and is provided with the manually controlled solenoid valve 57. The valve 57 is on the axis 58 of the driven shaft 30 and starts and stops the driven shaft 30 by permitting or preventing the free flow of fluid from the outlet 53 to the inlet 51. The valve 57 is closed by energization of solenoid 45, controlled by the manual switch 43, and by the other switches, as shown in Figure 1.

A fluid by-pass 60 is placed around the valve 57 and extends from the point 61 on the fluid discharge portion 54 of the pump to the point 62 at the fluid intake portion 52 of the pump. A centrifugally controlled valve 63 is placed in the by-pass and varies the speed radio drive between the engine and the compressor as the valve 63 opens centrifugally in response to engine speed. An adjustable fluid restrictor 64 is also placed in the by-pass. This restrictor may take the form of a threaded valve pin 65 which may be manually adjusted to vary the opening of the restrictor or valve, and thus determines the amount of by-passed fluid which can pass from the discharge portion 54 to the intake portion 52 and this in turn determines the low speed ratio of the drive. The high speed ratio of the drive occurs when the valve 63 closes, and no fluid is by-passed through passage 60 and also when no fluid is allowed to pass the valve 57 when it is closed.

The pump includes the cylinder 50 and a piston which may comprise a ring 70 and eccentric 71 secured to the shaft 30 in such a manner that the outer periphery of the ring 70 is closely adjacent to the inner wall 72 of the cylinder 50. A blade 73 is pressed by the spring 74 against the periphery of the ring 70 and thus maintains the pressure differential between the two sides 52 and 54 of the pump. The spring 74 is held in place by the screw plug 75.

Figure 5:
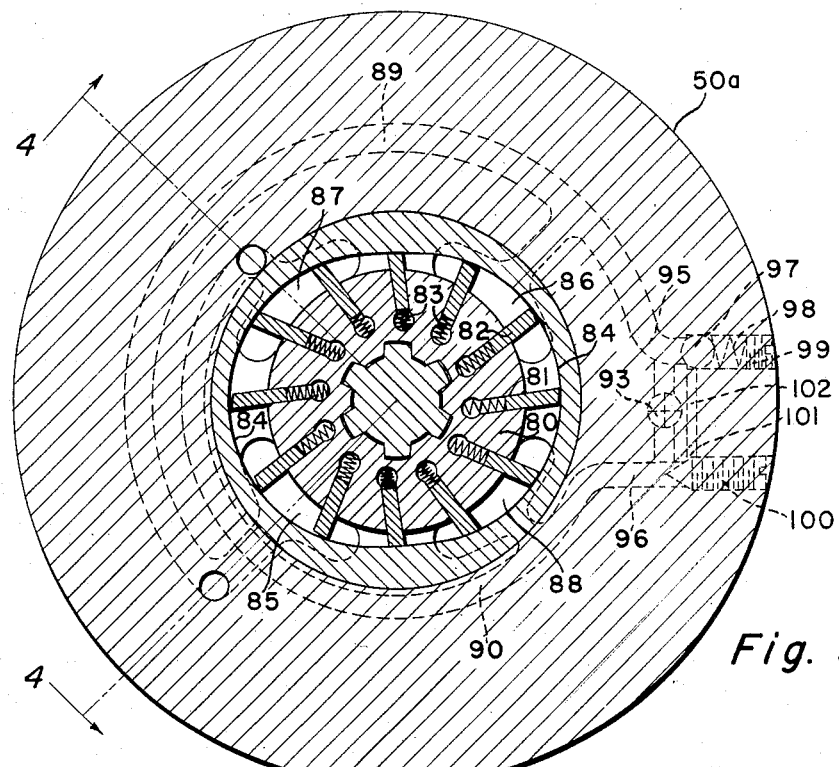
Figure 5 is a transverse view of the transmission shown in Figure 4 and taken along the line 5—5 of Figure 4, and with the valve in diagrammatic position.
Figure 4:
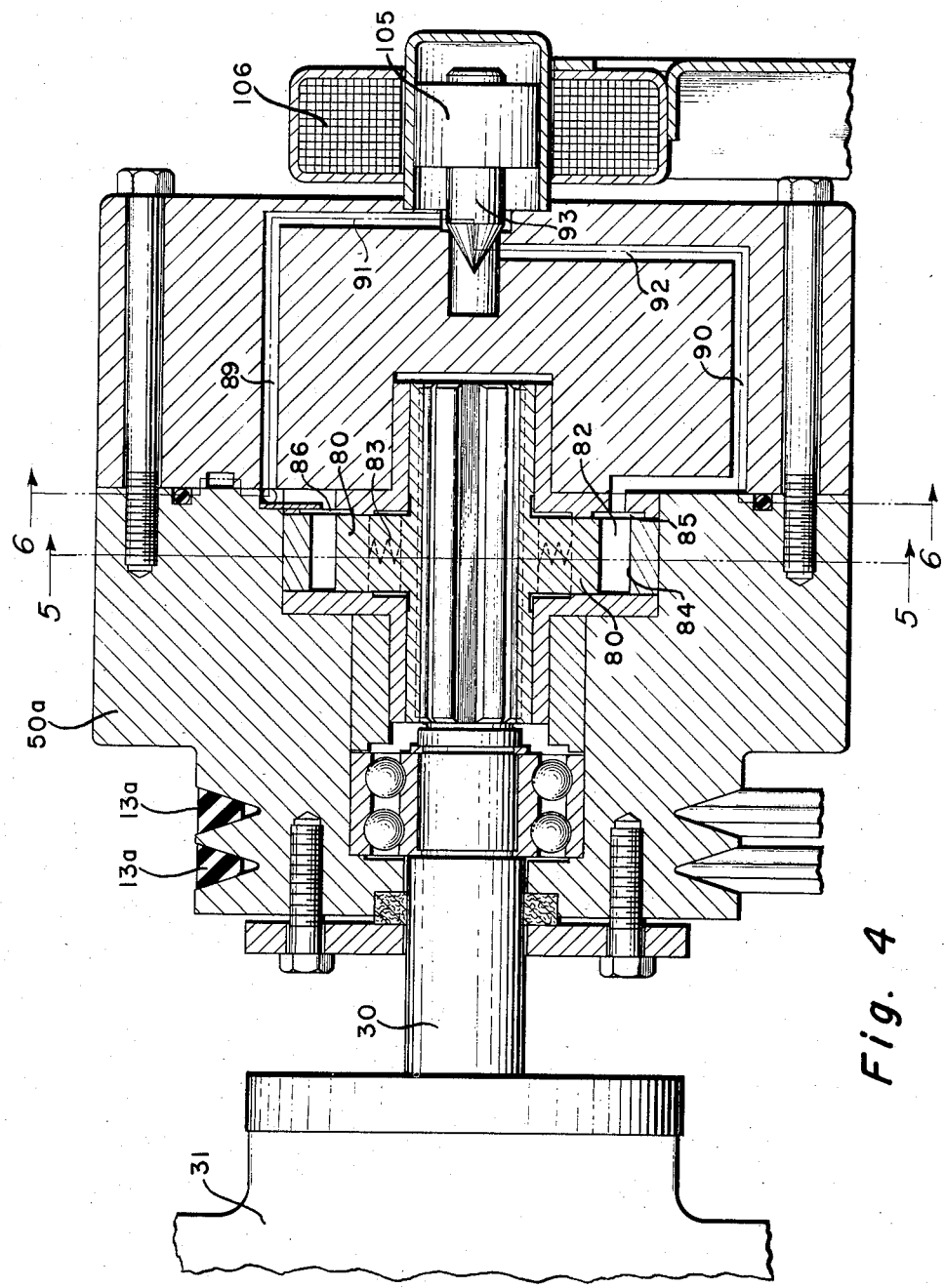
Figure 4 is a longitudinal view of a modified form of transmission.
Figure 6:
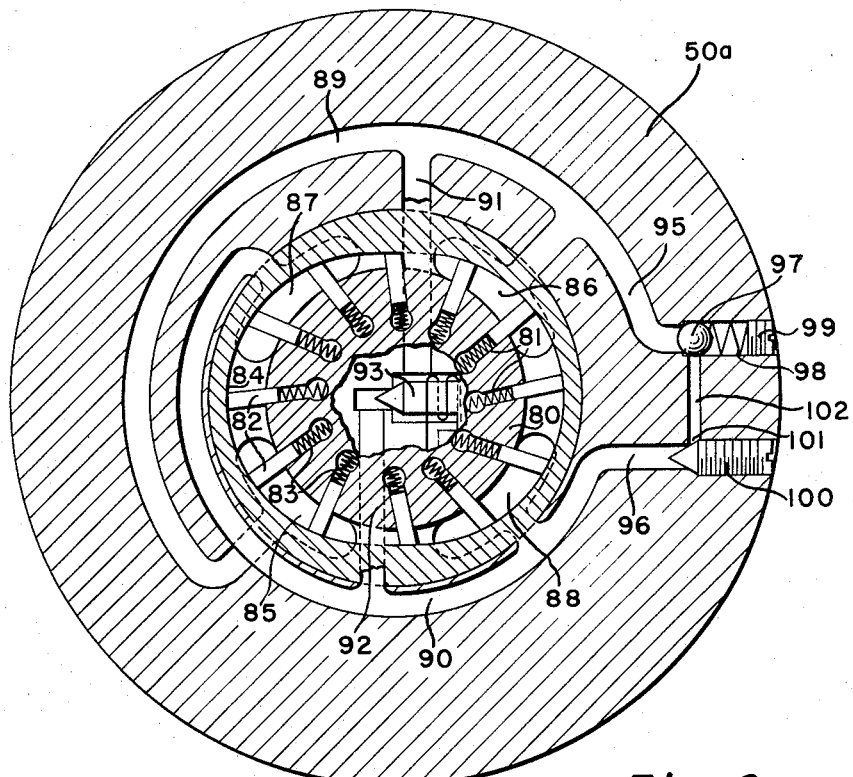
Figure 6 is a transverse view similar to Figure 5 on a somewhat different plane and showing the valve diagrammatically but more nearly in the actual position.

In the modification shown in Figures 4, 5 and 6, the compressor 31 has a shaft 30 which is driven by a slightly different type of pump. The belt or belts 13a, similar to belt 13, drive the pump cylinder 50a. The pump piston may include a ring 80 having a plurality of blade slots 81 in which are placed the blades 82 which are outwardly pressed by the springs 83 against the irregularly shaped cylinder wall 84. The cylinder 84 is provided with two discharge portions 85 and 86 and two intake portions 87 and 88. The discharge portions 85 and 86 are connected to the conduit portion 89 while the intake portions 87 and 88 are connected to the conduit portion 90. The conduit portions 89 and 90 are connected by the passageways 91 and 92 leading to the axis of the shaft 30 where the solenoid valve 93 is placed. The by-pass is formed by the conduit extensions 95 and 96 which lead to the centrifugal valve 97 pressed by the spring 98, the tension of which may be adjusted by the screw plug 99. The adjustable restrictor is in the form of a screw threaded valve pin 100 which may be adjusted to vary the opening 101 to regulate the amount of by-passed fluid which can flow through the by-pass conduit 102. In Figure 5, the solenoid valve 93 is diagrammatically indicated away from the shaft axis, in order that the fluid flow may be more readily understood. In Figure 6 the solenoid valve 93 is shown diagrammatically on the shaft axis, but transversely turned, in order that it may be seen in the figure, although the valve actually is in the form shown in Figure 4 with the valve plunger 105 coaxial with the shaft 30 and with the solenoid 106 also coaxial with the shaft 30.

The modification of Figures 4, 5 and 6 may be driven and controlled in a manner substantially as shown in Figure 1.

In the operation of the modification show in Figures 1, 2 and 3, the user closes the switch 43 whenever refrigeration is desired.

In operation, the user manually closes the ignition switch 43a and the air conditioning switch 43. Ordinarily switches 46, 47 and 48 are closed causing solenoid 45 to be energized to close valve 57. This prevents the flow of the oil or other fluid in conduit 55 and 56 of the pump system. If the engine 10 is rotating below the down shift speed, valve 63 is also closed. This locks the piston 70 to the cylinder 50 and transmits power from the belt 13 to the compressor 31 causing the refrigerating system to operate in the usual manner. If refrigerant or temperature conditions cause any of the switches 46, 47 or 48 to open, the solenoid 45 is de-energized, and the pump can circulate the fluid freely through conduit 55, 56 and cannot transmit power to the compressor shaft 30, and the compressor 31 stops. If all the switches 46, 47 and 48 remain closed, and the engine shaft 11 rotates at a speed above the down shift limit, the valve 63 opens centrifugally allowing a preselected amount of fluid to circulate through the by-pass 60 so that a limited relative rotation is possible between the cylinder 50 and piston 70. This causes the engine shaft 11 to drive the compressor 31 at a reduced rate or ratio, and prevents excessive compressor speed.

In the modification of Figures 4, 5 and 6, the pump cylinder 50a is locked to the piston 80 as long as the valves 93 and 97 remain closed, and the engine drives the compressor at relatively high ratio until the engine speed rises above the down shift limit. At that time the valve 97 opens centrifugally and permits a limited by-pass circulation of fluid through by-pass conduit 102 and a limited relative rotation between the cylinder 50a and piston 80. This causes the engine to drive the compressor at a limited speed ratio. The solenoid 106 is controlled in the same manner as the solenoid 45.

The reduced speed ratio in either modification may be manually adjusted by adjusting the valves 65 or 100. The down shift speed limit may be manually adjusted by varying the tension of spring 63a or spring 98 by turning the corresponding screw plug 63b or 99.

While the form of embodiment of the invention as herein disclosed constitutes a preferred form, it is to be understood that other forms might be adopted as may come within the scope of the claims which follow.

What is claimed is as follows:

1. In combination: a rotary driving member rotatable about an axis; a rotary driven member rotatable about said axis; a pump cylinder in continuous drive connection with one of said members and having a fluid intake portion and a fluid discharge portion; a pump piston in continuous drive connection with the other of said members; a fluid conduit from said discharge portion to said intake portion; a manually controlled valve in said conduit to vary the flow of fluid through said conduit; a fluid by-pass around said valve; a centrifugally controlled valve in said by-pass; and an adjustable fluid restrictor in series circuit relationship with said centrifugally controlled valve in said by-pass.

2. In combination, an engine having a rotary driving shaft, a compressor having a rotary driven shaft, a two speed hydraulic drive between said driving and driven shafts including a hydraulic pump having one pumping element connected to one of said shafts and an interfitting pumping element connected to another of said shafts, said hydraulic pump having an inlet and an outlet and by-pass means connecting said inlet and said outlet, a condenser and evaporating means operatively connected to said compressor to provide refrigeration, control means responsive to the temporary satisfaction of refrigeration requirements for fully opening said by-pass means to disconnect the compressor from the engine, said control means also including means responsive to the demand for refrigeration and to the speed of said engine for fully closing the by-pass means when the engine speed is low to cause the compressor to operate at a higher speed relative to the engine and for partly opening said by-pass means when the engine speed is high to cause the compressor to operate at a lower speed relative to the engine.

3. In combination, an engine having a rotary driving shaft, a fluid system including a first pump for pumping fluid in the system, said first pump having a rotary driven shaft, a two speed hydraulic drive between said driving and driven shafts including a hydraulic pump having one pumping element connected to one of said shafts and an interfitting pumping element connected to another of said shafts, said hydraulic pump having an inlet and an outlet and by-pass means connecting said inlet and outlet, control means responsive to the temporary satisfaction of requirements of said fluid system for fully opening said by-pass means for disconnecting said first pump from said engine, said control means also including means responsive to demands of said fluid system for fully closing said by-pass means when the engine speed is low to cause said first pump to operate at a higher speed relative to the engine, and for partly opening said by-pass means when the engine speed is high to cause the first pump to operate at a lower speed relative to the engine.

4. In combination, an engine having a rotary driving shaft, a fluid system including a first pump for pumping fluid in the system, said first pump having a rotary driven shaft, a two speed hydraulic drive between said driving and driven shafts including a hydraulic pump having one pumping element connected to one of said shafts and an interfitting pumping element connected to another of said shafts, said hydraulic pump having an inlet and an outlet and by-pass means connecting said inlet and outlet, control means for fully closing said by-pass means when the engine speed is low to cause said first pump to operate at a higher speed relative to the engine and for partly opening said by-pass means when the engine speed is high to cause the first pump to operate at a lower speed relative to the engine, said control means including an adjustable fluid restrictor in said bypass means in series flow relationship for adjusting the relationship between the speed of the engine and the pump.

References Cited in the file of this patent

UNITED STATES PATENTS

| 1,104,168 | Curtiss | July 21, 1914 |
|---|---|---|
| 1,233,967 | Bluemel | July 17, 1917 |
| 2,146,717 | Berger | Feb. 14, 1939 |
| 2,248,756 | Henney | July 8, 1941 |
| 2,313,049 | Cook | Mar. 9, 1943 |
| 2,614,396 | Raterman | Oct. 21, 1952 |

FOREIGN PATENTS

| 797,933 | France | Feb. 24, 1936 |